US008800044B2

(12) United States Patent (10) Patent No.: US 8,800,044 B2
Raad (45) Date of Patent: Aug. 5, 2014

(54) STORING AND ACCESSING THREAT INFORMATION FOR USE IN PREDICTIVE MODELING IN A NETWORK SECURITY SERVICE

(75) Inventor: Alexa Raad, Leesburg, VA (US)

(73) Assignee: Architelos, Inc., Leesburg, VA (US)

( * ) Notice: Subject to any disclaimer, the term of this patent is extended or adjusted under 35 U.S.C. 154(b) by 306 days.

(21) Appl. No.: 13/069,929

(22) Filed: Mar. 23, 2011

(65) Prior Publication Data

US 2012/0246730 A1    Sep. 27, 2012

(51) Int. Cl.
*H04L 29/00* (2006.01)

(52) U.S. Cl.
USPC ............................................ 726/25; 370/252

(58) Field of Classification Search
USPC ............................................ 370/252; 726/25
See application file for complete search history.

(56) References Cited

U.S. PATENT DOCUMENTS

| 6,742,128 | B1 | 5/2004 | Joiner ............................ 713/201 |
|---|---|---|---|
| 7,281,270 | B2 | 10/2007 | Piesco et al. ..................... 726/25 |
| 7,827,590 | B2 | 11/2010 | Hopen et al. ....................... 726/1 |
| 7,836,506 | B2 | 11/2010 | Liu .................................. 726/25 |
| 2005/0018618 | A1* | 1/2005 | Mualem et al. ................ 370/252 |
| 2005/0039046 | A1 | 2/2005 | Bardsley et al. .............. 713/201 |
| 2005/0225444 | A1 | 10/2005 | Clift et al. ................. 340/539.13 |
| 2007/0050305 | A1 | 3/2007 | Klein ................................ 705/67 |
| 2007/0136788 | A1 | 6/2007 | Monahan et al. .................. 726/3 |
| 2007/0209075 | A1 | 9/2007 | Coffman ......................... 726/23 |
| 2008/0106386 | A1 | 5/2008 | Li et al. ......................... 340/10.5 |
| 2008/0148398 | A1 | 6/2008 | Mezack et al. ................... 726/22 |
| 2009/0083413 | A1 | 3/2009 | Levow et al. .................... 709/224 |
| 2010/0319069 | A1 | 12/2010 | Granstedt et al. ............... 726/22 |
| 2011/0047620 | A1 | 2/2011 | Mahaffey et al. ............... 726/23 |

FOREIGN PATENT DOCUMENTS

WO    WO 2012/128974    9/2012

OTHER PUBLICATIONS

Traub, Ken, et al., "The EPCglobal Architecture Framework", EPCglobal Final Version 1.4 approved Dec. 15, 2010, copyright 2005-2010, 75 pages.
"Core Business Vocabulary Standard", EPCglobal, ratified on Oct. 13, 2010, copyright 2008, 2009, 2010, 55 pages.
Beier, Steve, et al., "Discovery Services—Enabling RFID Traceability in EPCglobal Networks", *International Conference on Management of Data COMAD 2006*, Dec. 14-16, 2006, 4 pages.
Thorne, Alan, "Building on RFID with the EPC Network", *RFID Journal Live!*, RFID Journal University, presentation prepared by EasyEPC, Apr. 4, 2005, 38 pages.
Rutkowski; Tony, "Enabling New RFID Communication Opportunities with EPC Network Services", *RFID and Telecommunication Services*, Sophia Antipolis, France, May 25, 2004, 19 pages.

* cited by examiner

*Primary Examiner* — Brandon Hoffman
*Assistant Examiner* — Michael D Anderson
(74) *Attorney, Agent, or Firm* — Pillsbury Winthrop Shaw Pittman LLP

(57) ABSTRACT

The system and method for predictive modeling in a network security service described herein may provide a scalable architecture that can model information relating to any specific threat or potential threat in a network and manage routing requests relating to the threat information among various entities participating in the security service. In particular, the scalable architecture may include various distributed databases that store serialized information describing threat instances, wherein a detection service may maintain information identifying entities associated with the databases storing the serialized information. Further, the security service may include a hierarchical subscriber name service that participating entities can traverse to locate the serialized threat information in the various databases and evaluate how the threat instances may have evolved or progressed through the network.

44 Claims, 4 Drawing Sheets

200A 01.0000389.000162.000169740

- Header 210
- TIC Manager 220
- Object Class 230
- Serial Number 240

200B

Threat Information Code

URN:ASN:RSNS:65677.35246.1234

Serialized Threat Code

Specific Threat Code

| Syntax | 4th Level | 3rd Level | 2nd Level | Top Level |
|---|---|---|---|---|
| Domain Name | ds . | vnds . | verisign . | com |
| TIC | 35246 . | 65677 . | RSNS . | com |

Object Class 230

Subscriber Identifier 220

STORING AND ACCESSING THREAT INFORMATION FOR USE IN PREDICTIVE MODELING IN A NETWORK SECURITY SERVICE

FIELD OF THE INVENTION

The invention generally relates to a distributed system and method for storing and accessing threat information for use in predictive modeling in a network security service, and in particular, to a scalable and distributed architecture having various databases that store serialized information to describe threat instances detected in a network, a detection service that maintains information to identify entities associated with the databases that store the serialized information providing knowledge about specific threat instances, and a hierarchical subscriber name service that can be traversed to locate the serialized threat information in the various databases and evaluate how the threat instances may have evolved or progressed through the network.

BACKGROUND OF THE INVENTION

In many online or network security contexts, malicious users typically attempt to exploit network vulnerabilities to gain unauthorized access, disrupt operations and performance associated with network resources, or otherwise initiate threats to attack network resources or systems. As such, existing network security systems typically take a mitigation approach to detect, remediate, or otherwise manage network threats that have already exploited certain vulnerabilities to cause damage or other interference threatening operations and performance associated with network resources or systems. In other words, rather than taking a predictive approach to model or sense potential network threats across wide networks, existing network security systems tend to mitigate damage to network resources and systems that have already been compromised. Consequently, many existing network security systems tend to focus on assessing and analyzing malicious network activity or threats that may have already caused damage to network resources and systems, but mitigation approaches alone are insufficient to predict network threats that may attempt to damage network resources or systems in the future or prevent certain predicted network threats from damaging network resources or systems in the first place.

As such, many organizations typically have to expend substantial resources to protect network resources against any and all threats that may occur. For example, some common network threats include distributed denial-of-service (DDoS) attacks where automated botnets cause out-of-baseline network activity to prevent normal use, phishing attacks where malicious users masquerade as trusted entities to obtain authentication credentials, credit card details, or other personal information from unsuspecting individuals, and malware attacks where hostile or intrusive program code may harm or secretly access a targeted computer system, among many others. Furthermore, because the most worrisome network security threats typically impact more than one party, various efforts to manage network security across wide networks have attempted to create central databases that describe any and all known network threats. However, malicious users can then attempt to hack into the central network threat databases to obtain information about any known network threats detailed therein and potentially attack the databases themselves (e.g., initiating a denial-of-service attack on the central databases to prevent legitimate entities from accessing or utilizing information stored therein).

Moreover, many existing network security systems tend to only share data relating to known security threats within small trusted networks, which can increase costs that registries, registrars, network service providers, and enterprises alike need to expend in order to battle security threats. For example, large service providers may resell or distribute shared security threat data to other entities outside their small trusted network, thereby increasing the overall cost to share security threat data among all parties that may have knowledge relevant to predicting, preventing, or mitigating the damage that the security threats may cause, while further increasing a likelihood that entities within the small trusted network will not have access to knowledge that entities outside the trusted network may have in relation to the security threat data. Furthermore, certain entities may prefer to keep knowledge relating to known security threats private within their small trusted networks due to competitive fears, legal and regulatory barriers, and other concerns. As such, limiting cooperation between entities that having knowledge relating to network security threats may reduce the number of reporting entities that could contribute to predicting and preventing network threats from arising prior to the damage already having been done, cause security threat data to have stale attributes that can undermine the relevance associated with the purported knowledge over time, and increase the costs and risks associated with managing network security threats to every potentially impacted entity, among other drawbacks.

Therefore, existing network security systems tend to fall short in adequately providing predictive models that can be used to sense potential threats across wide networks, reduce the costs associated with protecting network security, and predicting potential threats to prevent network damage in advance and thereby enhance network safety.

SUMMARY OF THE INVENTION

According to one aspect of the invention, the system and method for predictive modeling in a network security service described herein may provide a scalable architecture that can model specific information relating to any threat (or potential threat) in a wide or global network and quickly and efficiently route the information relating to the modeled network threats to multiple requesting entities. For example, the scalable architecture may be based on the hierarchical Domain Name System (DNS) architecture, while information relating to any particular threat instances or potential threat instances may be serialized or otherwise modeled with threat instance codes that can uniquely identify the particular threat instances or potential threat instances in a similar to an electronic product code (EPC) scheme. Accordingly, the threat instance codes may be used to categorize network threats based on current types and future variations to indicate how the threats may have evolved, how the threats have progressed throughout the wide or global network, and substantially reduce competitive fears, legal and regulatory barriers, and other concerns that may interfere with sharing information that models network threats.

According to one aspect of the invention, the system and method described herein may generally use threat instance codes used to serialize, categorize, or otherwise model network threats and potential network threats. In particular, the threat instance codes may include serialized bar codes or other data structures based on the EPC naming scheme. The threat instance codes may therefore enable various participating entities to control how information relating to serialized threat instances will be shared among other participants. For example, every participant in the security service may have a database to contain information describing threats and potential threats detected in a particular network, while attributes that other participants have provided to describe the threats and potential threats may be distributed or otherwise shared to enable other participants to correlate attributes associated with threats and potential threats that they have reported. As such, the security service may achieve a critical mass in reporting participants, which may enable building and continually refreshing a knowledge base detailing known threats or potential threats over time. Furthermore, every participant in the security service may have a separate database to describe threats and potential threats that have been detected in particular networks, whereby hacking into any particular database associated with the security service may be rendered substantially useless because no particular database will store the overall context associated with the threat data.

According to one aspect of the invention, the system and method described herein may generally include a security network having a root subscriber name service that can store an authoritative record with unique codes to describe a registry, various subscribers or registrars, and various network service providers that may participate in the security service. As such, the registry, the subscribers or registrars, and the network service providers may communicate requests to the security network to obtain information relating to specific threats or threat instances, wherein the root subscriber name service may route the requests among the registry, the subscribers or registrars, the network service providers, and any other participants to enable the requesting participants to appropriately obtain the requested threat information. For example, the security service may include various subscriber information service databases that the various participants maintain to store threat information, wherein the threat information codes may provide keys that can be used to obtain the information about the threats described in the subscriber information service databases, whereby using various subscriber information service databases may ensure that no particular database will need to store substantial amounts of threat information or handle substantial threat requests. In particular, threat information may be distributed across several nodes associated with the registry, the network service providers, and other participants, wherein the root subscriber name service and local subscriber name services associated with the registry and the network service providers may be arranged hierarchically under the root subscriber name service (i.e., the root subscriber name service may have a root node pointing to a node associated with a local subscriber name service, which may indicate a particular subscriber information service database having data relevant to a particular threat). Further, because the root subscriber name service and the local subscriber name services may be arranged hierarchically, the local subscriber name services may cache certain threat information codes and location information associated with certain threats described or otherwise requested in the subscriber information service databases associated therewith (e.g., to reduce a need to query the root subscriber name service for every threat request).

According to one aspect of the invention, the detection service may provide various mechanisms that participants can use to locate particular subscriber information service databases that store information relevant to a particular threat. In particular, the detection service may store various attributes relating to threats that have been reported and provide participants with information that can be used to locate a particular subscriber information service database that stores information relevant to a particular threat. For example, to describe a particular threat instance, the detection service may store threat instance codes that represent partitioning schemes associated with threat instances, flags to control how the records can be shared, a network location associated with the subscriber information service database that submitted the records, and serial numbers to uniquely identify threat instances, among other things. In one implementation, the records stored in the detection service may therefore enable participants to locate particular subscriber information service databases that store relevant threat information, wherein any particular participant in the security service may query the detection service with a threat information code to obtain information that identifies the particular subscriber information service database that stores information associated with the relevant threat. The requesting participant may then query the relevant subscriber information service database to obtain the threat information, including additional attributes associated with the threat (e.g., an originating network address, a domain name used in the threat instance, a registrar that originally reported the threat instance, etc.). Further, the security service may include one or more validation engines to secure access to the subscriber information service databases, whereby querying subscribers may only obtain data attributes relating to certain threats if the validation engines determine that the querying subscriber has authorization or an appropriate trust level that permits access to the information and that any flags in the threat instance codes permit sharing the information with the participant.

According to one aspect of the invention, in response to the validation engines verifying that the querying participants have authorization or appropriate trust levels that permit access to the threat information, the querying participants may then evaluate or otherwise assess the threat data attributes. For example, the predictive algorithms may be used to assess a size, scope, potential impact, or other properties associated with the threat based on the data attributes obtained from various sources that have appropriate knowledge about the threat. For example, the predictive algorithms may be used to evaluate how the threat may impact network resources or systems specifically associated with the querying participant and/or whether any other network domains may be compromised. For example, if various domains have different subscribers that were registered from a network domain associated with the same network service provider and that the network service provider reported a particular threat, the predictive algorithms may be used to initiate proactive steps to inform the subscribers in the domain associated with the reporting network service provider that the reported threat may have compromised resources or systems in their networks. Accordingly, the system and method described herein may establish various mechanisms to track threat instances that can take any potential path to travel through wide or global networks without establishing or otherwise defining any a priori paths that the threats may take. In this context, the system and method described herein may enable have a subscriber to first define a threat instance code associated with a particular threat instance in a particular threat category, while other threat instance codes associated with similar threat instances or in the same threat category may be reported regardless of any predefined relationship with the subscriber that first reported the threat instance or threat category. As such, the system and method described herein need not limit tracking threat instances or threat categories within any particular path, but rather may utilize threat data attributes that various subscribers may report to evaluate how a threat may have morphed or progressed through a wide or global network.

Other objects and advantages of the invention will be apparent to those skilled in the art based on the following drawings and detailed description.

DETAILED DESCRIPTION

Figure 1:
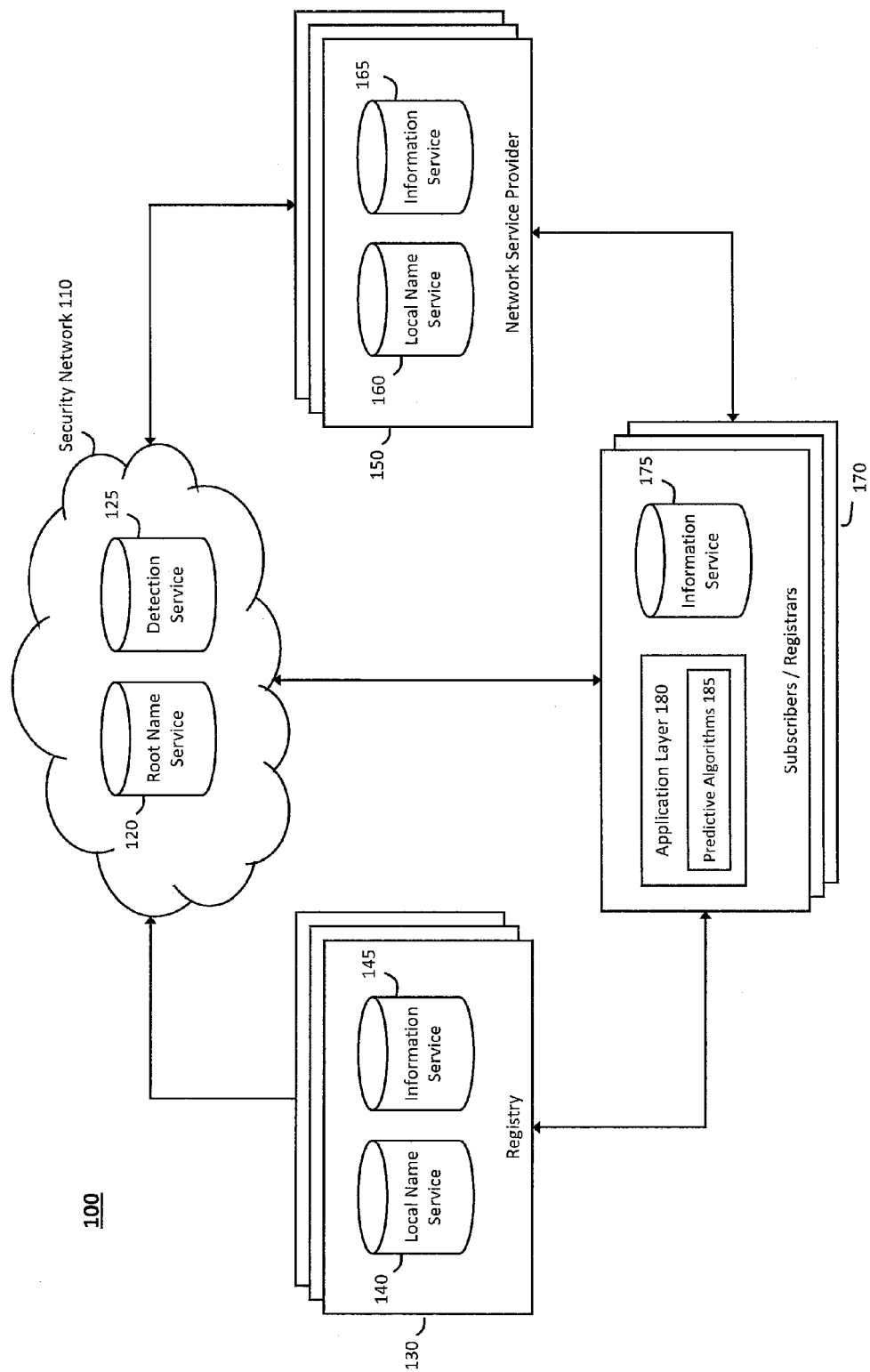
FIG. 1 illustrates an exemplary system for predictive modeling in a network security service, according to one aspect of the invention.

According to one aspect of the invention, FIG. 1 illustrates an exemplary system 100 for predictive modeling in a network security service. In particular, the system 100 illustrated in FIG. 1 may provide a scalable architecture that can model specific information relating to any threat (or potential threat) in a wide or global network and quickly and efficiently route the information relating to the modeled network threats (or potential network threats) to multiple entities that may request such information. For example, in one implementation, the scalable architecture in the system 100 may be based on the hierarchical Domain Name System (DNS) architecture, while information relating to any particular threat instances or potential threat instances may be serialized or otherwise modeled with threat instance codes that can uniquely identify the particular threat instances or potential threat instances. Accordingly, the threat instance codes may enable the system 100 to categorize network threats and potential network threats based on current types and future variations that the threats and potential threats may evolve into (e.g., botnet, malware, phishing, etc.) and substantially reduce competitive fears, legal and regulatory barriers, and other concerns that may interfere with sharing the modeled information because every participant in the system 100 may keep data relating to threats and potential threats detected in a network private.

In one implementation, the threat instance codes used to serialize, categorize, or otherwise model network threats and potential network threats may include a serialized bar code or other data structure having a scheme similar to an electronic product code (EPC) that can be used to uniquely identify product instances in supply chain management contexts. For example, various EPC standards have been defined to enable enterprises to share data relating to certain products that have been tagged with electronic product codes based on radio-frequency identification (RFID) reader events that occur in response to the products moving from one location to another within a supply chain. In particular, the EPC standards generally establish mechanisms to store records that include various attributes relating to tagged products, wherein the attributes in a particular record may include an EPC number associated with the tagged product, a Uniform Resource Locator (URL) or other identifying information associated with an entity that submitted the record to indicate custody associated with the product, a visibility flag to control entities that have access to the record, and a timestamp to indicate when the record was created (e.g., as described in "Discovery Services—Enabling RFID Traceability in EPCglobal Networks," the contents of which are hereby incorporated by reference in their entirety). As such, in one implementation, the system 100 may utilize threat instance codes to serialize and track threat instances in a generally similar manner to how the EPC scheme uses unique serial numbers to identify and track product instances.

In one implementation, the threat instance codes used to serialize and track threat instances in the system 100 may enable various entities that participate in the system 100 to control how information relating to serialized threat instances will be shared among other participants. For example, every participant in the system 100 may have a database to contain information describing threats and potential threats detected in a particular network, while the system 100 may distribute or otherwise share attributes that other participants have provided to describe the threats and potential threats to enable participants to correlate attributes associated with threats and potential threats that they have reported. As such, the participants reporting threats and potential threats may be distributed in any suitable location in a wide or global network, which may provide a critical mass in reporting participants that can be used to build and continually refresh a knowledge base detailing known threats or potential threats over time. Moreover, building and continually refreshing the knowledge base over time with threat instance codes reported from various participating entities may be used to predict how certain threats or potential threats may evolve in the future (e.g., malware threats that may be timed to initiate attacks in the future tend to stay under the radar, wherein entities that detect threats that will be initiated in the future may be used to predict or model the scope and impact that the malware may have when they will be triggered). Furthermore, because every participant may have a separate database to describe threats and potential threats that have been detected in particular networks, hacking into any particular component in the system 100 may be rendered substantially useless because no particular component stores an overall context associated with the data stored therein (i.e., the information in the threat instance codes may only be useful to the extent that an attacker knows the particular entity that reported the threat or potential threat associated therewith).

In one implementation, to enable predictive network security service modeling, the system 100 may generally include a security network 110 having a root subscriber name service (or root name service) 120 and a detection service 125. In particular, the root name service 120 may generally store an authoritative record that includes unique codes to describe various registries 130, various subscribers or registrars 170, and various network service providers 150 that may participate in the system 100. As such, in one implementation, the registries 130, the subscribers or registrars 170, and the network service providers 150 may communicate requests to the security network 110 to provide and/or obtain information relating to specific threats or threat instances, wherein the root name service 120 may route the requests among the registry 130, the subscribers or registrars 170, the network service providers 150, and any other participants to enable the requesting participants to appropriately obtain the requested information relating to specific threats or threat instances. For example, as noted above, every participant may have a separate database to describe specific threats and potential threats that the respective participants have detected, whereby the databases may generally include information services (or subscriber information services) 145 associated with the registries 130, information services 175 associated with the various subscribers or registrars 175, and information services 165 associated with the various network service providers 150.

In one implementation, the various information service databases 145, 165, and 175 may store information about the threats described therein and threat information codes may provide keys that can be used to obtain the information about the threats described in the various databases. Thus, storing threat information in the various databases may ensure that no particular database will be required to store substantial amounts of threat information or handle substantial numbers of requests to obtain threat information. In particular, the information services 145 associated with the registries 130 and/or the information services 165 associated with the network service providers 150 may include several databases to store threat information, meaning that the databases that store the threat information may be distributed across several nodes associated with the registries 130 and/or the network service providers 150. As such, the root name service 120, the local name services 140 associated with the registries 130, and the local name services 160 associated with the network service providers 150 may be arranged hierarchically, wherein the root name service 120 may generally include a root node that points to nodes associated with the registry local name services 140, which may indicate a particular database in the registry information services 145 that has data relevant to a particular threat request. Similarly, the root node in the root name service 120 may further point to nodes associated with the network service provider local name services 160, which may indicate a particular database in the network service provider information service 165 or a subscriber information service 175 having the relevant threat data. Further, because the root name service 120, the registry local name services 140, and the network service provider local name services 160 may be arranged hierarchically, the registry local name services 140 and the network service provider local name services 160 may cache threat information codes, location information, and other attributes associated with certain threats requested therefrom (e.g., to reduce a need to query the root name service 120).

Figures 2A, 2B:
FIGS. 2A and 2B illustrate exemplary threat information code data structures for predictive modeling in a network security service, according to one aspect of the invention.

In one implementation, the detection service 125 associated with the security network 110 may therefore provide a tool that participants can use to locate particular information services in the system 100 that store information relevant to a particular threat request. In particular, the detection service 125 may store various attributes relating to threats that have been reported in the system 100 in order to provide participants with information that can be used to locate a particular information service that stores information relevant to a particular threat. For example, FIG. 2A illustrates an exemplary threat information code record 200A, which may be used to store the various attributes relating to threats that have been reported in the system 100, according to one aspect of the invention. In particular, to describe a particular threat instance, the exemplary record 200A shown in FIG. 2A may include a header 210 that indicates a partitioning scheme associated with the threat instance (e.g., a flag to indicate whether the record 200A can be shared with anyone, only with parties that have submitted other records 200A associated with the same threat instance, etc.). Furthermore, the record 200A may include a threat information code manager 220 to represent a network location (e.g., a URL) associated with the information service that submitted the record and detected the threat instance in their network, and further to represent a certificate associated with a company or entity that owns or operates the information service that submitted the record. In addition, a serial number 240 may uniquely identify the threat instance described in the record 200A and encode a timestamp that indicates when the record 200A was reported, while an object class 230 may indicate a type associated with the threat instance described in the record 200A. However, the record 200A shown in FIG. 2A should be considered exemplary only, for other suitable variations and configurations may be used to suitably represent the foregoing information associated with the represented threat instance.

In one implementation, as noted above, the records 200A in the detection service 125 may therefore enable participants to locate particular information services that store relevant information associated with a particular threat. In particular, any particular participant may query the detection service 125 with a threat information code associated with a particular threat, and the detection service 125 may then return information that identifies the particular information service that stores the relevant threat information. In one implementation, as will be described in further detail herein, the requesting participant may then query the relevant information service to obtain the threat information, wherein the information services may store records similar to the record 200A shown in FIG. 2A, except that the records stored in the information services may further include other attributes associated with the threat (e.g., an originating network address, a domain name used in the threat instance, a registrar that originally reported the threat instance, etc.). As such, in response to obtaining the threat information and relevant attributes associated therewith from the appropriate information service, the requesting participant may then correlate the obtained information and attributes with relevant threat information stored in their databases using one or more predictive algorithms 185 in an application layer 180 that can assess or otherwise model the threat.

Having provided the above overview relating to the system 100 shown in FIG. 1, an exemplary scenario that relates to how the system 100 may be used to report and create predictive models relating a particular threat instance will now be described. In particular, the exemplary description provided herein may relate to a CREATE transaction threat instance that a subscriber or registrar 170 suspects to relate to a phishing attack in a network that the subscriber or registrar 170 owns or operates, although the threat instance may include any suitable transaction or network activity that may relate to a network threat or potential network threat. For example, in operation, a lifecycle associated with the CREATE transaction threat instance may begin in response to a subscriber or registrar 170 detecting the CREATE transaction in their network and generating a threat information code to uniquely identify or otherwise tag the threat instance. In one implementation, the subscriber 170 may then record the threat information code into the registry information service 145, wherein the threat information code may represent a type (e.g., create or renewal) associated with the threat instance, a date when the subscriber 170 detected the threat instance, an originating network address associated with the threat instance, or any other suitable information that describes the detected threat instance. For example, FIG. 2B illustrates an exemplary data structure 200B associated with the threat instance recorded into the registry information service 145. In particular, the threat information code may include a specific threat code associated with the threat instance (i.e., "65677.35246") and a serialized threat code associated with the threat instance (i.e., "1234"). Furthermore, as shown in FIG. 2B, a syntax to arrange the information relating to the threat information code may be similar to a syntax used to arrange information relating to a domain name. For example, the syntax used to serialize the "1234" string that uniquely identifies the threat instance may include a combined top-level and second-level domain that identifies the root subscriber name service 120 associated with the security network 110 (i.e., RSNS.com), a third-level domain that provides a subscriber identifier 220 associated with the subscriber 170 reporting the threat instance (i.e., 65677 to identify the subscriber as Nominet), and a fourth-level domain that identifies an object class 230 associated with the threat instance (i.e., 35246 to identify the threat instance as a Zeus Botnet).

In one implementation, in response to the subscriber 170 recording the threat information code associated with the detected threat instance into the registry information service 145, the registry information service 145 may then register knowledge relating to the threat instance code with the detection service 125. Furthermore, in one implementation, a network service provider 150 may detect a phishing domain on a network that the network service provider 150 owns or operates and record the phishing domain into an information service database 165 associated with the network service provider 150. For example, the network service provider 150 may service the network associated with the subscriber 170 that originally reported the suspected phishing attack, whereby the network service provider 150 would detect the phishing domain due to the phishing attack on the network associated with the subscriber 170. Alternatively (or additionally), the network service provider 150 may detect the phishing domain on a network separate from the network associated with the subscriber 170. In either case, the phishing domain detected by the network service provider 150 may have similar attributes to the phishing attack detected by the subscriber 170, whereby the network service provider 150 may record knowledge relating to the phishing domain with the detection service 125 in order to build further knowledge that can be used to model phishing attacks and phishing domains that may occur in any particular location in a wide or global network. Furthermore, the network service provider 150 may record knowledge relating to the phishing domain into the information service database 165 and the detection service 125 to build further knowledge that can be used to model phishing attacks and phishing domains that may occur in any particular location in a wide or global network.

In one implementation, in response to another subscriber or registrar 170 detecting a particular threat instance or threat domain, the subscriber 170 may query the detection service 125 to obtain locations associated with any other participant in the system 100 that may have knowledge about the particular threat instance or threat domain. For example, in response to the other subscriber 170 detecting a phishing threat or phishing domain similar to the reported instances described above, the other subscriber 170 may query the detection service 125 with information relating to the detected threat or domain and the detection service 125 may return one or more codes to identify any other subscribers 170, network service providers 150, or other participants that have registered knowledge about the threat. In one implementation, the other subscriber 170 may then query the root name service 120 with the one or more codes returned from the detection service 125, and the root name service 120 may return one or more locations associated with any information services that registered the knowledge about the threat. For example, in the context associated with the phishing threat and phishing domain described above, the registry 130 and the network service provider 150 would be the participants associated with the information services that registered the knowledge about the threat, whereby the one or more locations returned from the root name service 120 would identify local name service 140 associated with the registry 130 and local name service 160 associated with the network service provider 150.

As such, in response to the root name service 120 returning the locations that identify the registry local name service 140 and the network service provider local name service 160, the querying subscriber 170 may then query the registry local name service 140 and the network service provider local name service 160 to obtain information that identifies the database in the registry information-service 145 and the database in the information service 165 associated with the network service provider 150 that stores the knowledge about the threat. In one implementation, the registry local name service 140 may then return a location that identifies the database in the registry information service 145 that stores the knowledge about the threat, and the network service provider local name service 160 may similarly return a location that identifies the database in the information service 160 where the network service provider 150 stores the knowledge about the threat. The querying subscriber 170 may then query the information service 145 and the information service 165 to obtain any additional data attributes that the respective information services 145 and 165 have about the threat. Further, In one implementation, one or more validation engines may secure access to the registry information service 145 and the network service provider information service 165, wherein the querying subscriber 170 may only obtain the data attributes stored therein if the validation engines determine that the querying subscriber 170 has authorization or an appropriate trust level that permits access to the information.

In one implementation, assuming that the validation engine determines that the querying subscriber 170 has authorization or an appropriate trust level that permits access to the information stored in the respective information services 145 and 165, the querying subscriber 170 may obtain the data attributes that provide the knowledge about the threat, which may then be used to assess a size, scope, potential impact, or other properties associated with the threat, whereby the querying subscriber 170 may then have the data attributes about the threat from various appropriate sources that have knowledge about the threat (i.e., the registry information service 145, the network service provider information service 165, and/or any other information services having registered knowledge about the threat). Accordingly, the querying subscriber 170 may then invoke an application layer 180, which may use various predictive algorithms 185 to evaluate the threat data attributes received from multiple appropriate sources and analyze or otherwise determine the size, scope, potential impact, or other properties associated with the threat. In one implementation, the application layer 180 may utilize the predictive algorithms 185 to evaluate how the properties associated with the threat may impact network resources or systems specifically associated with the querying subscriber 170. Furthermore, in one implementation, the application layer 180 may utilize the predictive algorithms 185 to determine whether any network domains other than the network domain specifically associated with the querying subscriber 170 may be compromised and determine a degree of certainty that any such network domains may be compromised. For example, various domains may have different subscribers or registrars 170, but the root name service 120 and/or the detection service 125 may indicate that the different subscribers or registrars 170 may be registered from a network domain associated with the same network service provider 150. As such, if the network service provider 150 associated with the different subscribers 170 reported information about the threat, the application layer 180 may notify the querying subscriber 170 to initiate proactive steps to inform the subscribers 170 in the domain associated with the reporting network service provider 150 that the evaluated threat may have compromised their networks.

Accordingly, the above description relating to the system 100 shown in FIG. 1 may establish various mechanisms that may be used to track threat instances that can take any potential path to travel through wide or global networks. In particular, the system 100 may be used to track how particular threat instances actually travel through wide or global networks without establishing or otherwise defining any a priori paths that the threat may take through the wide or global networks. In this context, although the system 100 may have similarities to the EPC scheme that may be used to track movement associated with product instances in a supply chain, the EPC scheme generally tracks whether product instances properly adhere to specific distribution channels or paths in the supply chain. For example, a specific manufacturer or distributor (and no one else) may produce a particular product shipment destined to travel through a specific supply chain path, whereby the EPC scheme may generate an exception in response to detecting an RFID reader event indicating that a product instance associated with the shipment occurred outside the specific supply chain path or a break occurs in a "track and trace" custody chain associated with the shipment or product instances associated therewith. In contrast, the system 100 described herein may have a subscriber 170 first define a threat instance code associated with a particular threat instance in a particular threat category, while other threat instance codes associated with similar threat instances or in the same threat category may be reported regardless of any predefined relationship with the subscriber that first reported the threat instance or threat category. Accordingly, the system 100 described herein need not limit tracking threat instances or threat categories within any particular path, but rather may utilize threat data attributes that various subscribers may report to evaluate how a threat may have morphed (e.g., from phishing to malware) or how the threat may be progressing through wide or global networks.

Figure 3:
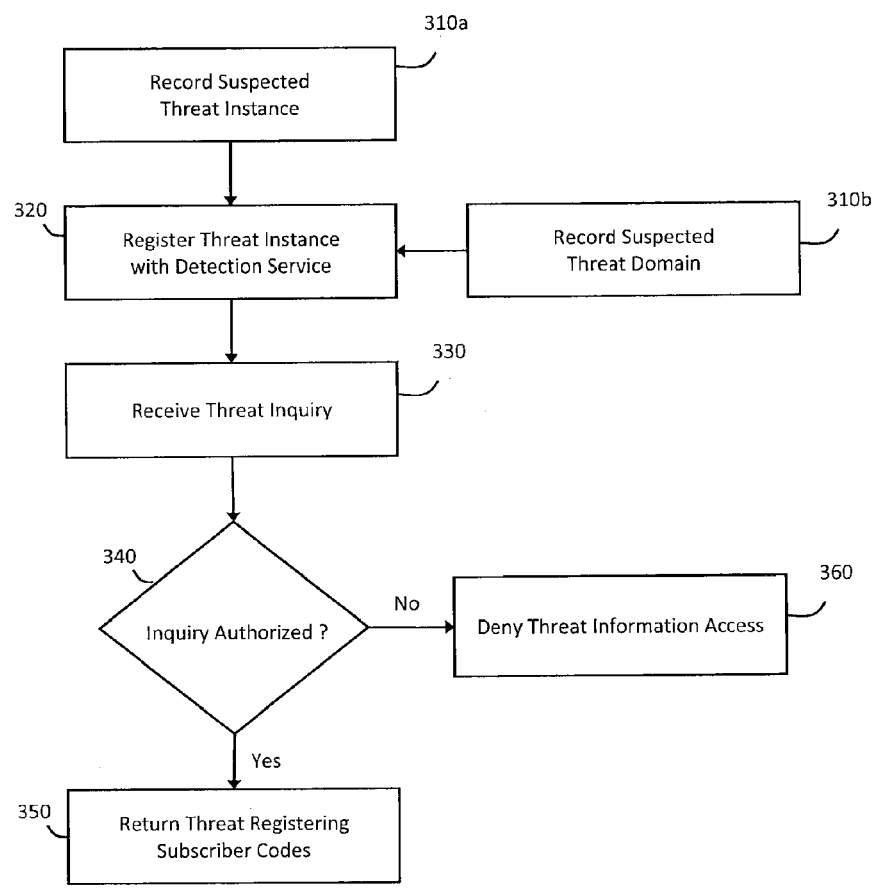
FIG. 3 illustrates an exemplary method for registering suspected threat instances to provide a predictive network security service model, according to one aspect of the invention.

According to one aspect of the invention, FIG. 3 illustrates an exemplary method 300 for registering suspected threat instances to provide a predictive network security service model. In particular, the method 330 may generally enable various subscribers or registrars participating in the predictive network security service to report particular threat instances and thereby create a predictive model relating the threat instances. For example, in response to a subscriber or registrar detecting an attack or other threat instance in a network, an operation 310*a* may include a subscriber or registrar generating a threat information code to uniquely identify or otherwise tag the threat instance. In one implementation, operation 310*a* may further include the subscriber may recording the threat information code into a subscriber information service associated with a registry in the network security service, wherein the threat information code may represent a type associated with the threat instance, a date when the subscriber detected the threat instance, an originating network address associated with the threat instance, or any other suitable information that describes the detected threat instance. In one implementation, in response to the subscriber recording the threat information code associated with the detected threat instance into the subscriber information service associated with the registry, the subscriber information service associated with the registry may then register knowledge relating to the threat instance code with the detection service in an operation 320.

In one implementation, and in parallel to the subscriber detecting, recording, and registering the threat instance in operations 310*a* and 320, a network service provider may detect the threat in a domain associated with a network that the network service provider owns or operates in an operation 310*b*, wherein the network service provider may then record the threat domain into a subscriber information service database associated with the network service provider. For example, the network service provider may service the network associated with the subscriber that originally reported the suspected threat instance, whereby the network service provider would detect the threat domain due to the threat instance occurring on the network associated with the subscriber. Alternatively (or additionally), the network service provider may detect the threat domain on a network separate from the network associated with the subscriber. In either case, the threat domain detected by the network service provider may have similar attributes to the threat instance that the subscriber recorded and registered in operations 310*a* and 320, whereby the network service provider may similarly register knowledge relating to the threat domain with the detection service in operation 320 to build further knowledge that can be used to model threat instances and threat domains that may occur in any particular network location.

In one implementation, in response to another subscriber or registrar detecting a particular threat instance or threat domain, an operation 330 may include receiving a threat inquiry from the other subscriber, wherein the threat inquiry may include a query requesting the detection service to provide locations associated with any other participant in the security service that may have knowledge about the particular threat instance or threat domain. For example, in response to the other subscriber detecting a threat instance or threat domain similar to the threat instances and threat domains reported in operations 310*a*, 310*b*, and 320, the other subscriber may query the detection service in operation 330 with information relating to the detected threat or threat domain. In one implementation, an operation 340 may then include one or more validation engines determining whether the requesting subscriber has authorization to obtain the requested information relating to the locations associated with the participants that may have knowledge about the particular threat instance or threat domain. In particular, the validation engines may generally secure access to subscriber information service databases associated with the registry and the network service provider that registered the threat instance with the detection service, wherein operation 340 may result in the validation engines authorizing the threat inquiry if the querying subscriber has authorization or an appropriate trust level that permits access to the information, and further if any threat instance codes that describe threat instances associated with the inquiry permit sharing with the requesting subscriber.

Accordingly, in response to the validation engines determining that the querying subscriber lacks authorization or an appropriate trust level that permits access to the threat information, or alternatively if the threat instance codes that describe the threat instances associated with the inquiry prohibit sharing the information with the requesting subscriber, the validation engines may deny access to the threat information in an operation 360. Otherwise, if the validation engines determine that the querying subscriber has authorization or an appropriate trust level that permits access to the threat information, and that the threat instance codes that describe the threat instances associated with the inquiry further permit sharing the information with the requesting subscriber, the validation engines may authorize the threat inquiry in operation 340. As such, in response to authorizing the threat inquiry, an operation 350 may include the detection service returning one or more subscriber codes to identify the registry, any network service providers, or any other subscribers that have registered knowledge about the threat, wherein the querying subscriber may then use the subscriber codes to obtain further information, attributes, or other knowledge about the threat, as will be described in further detail herein.

Figure 4:
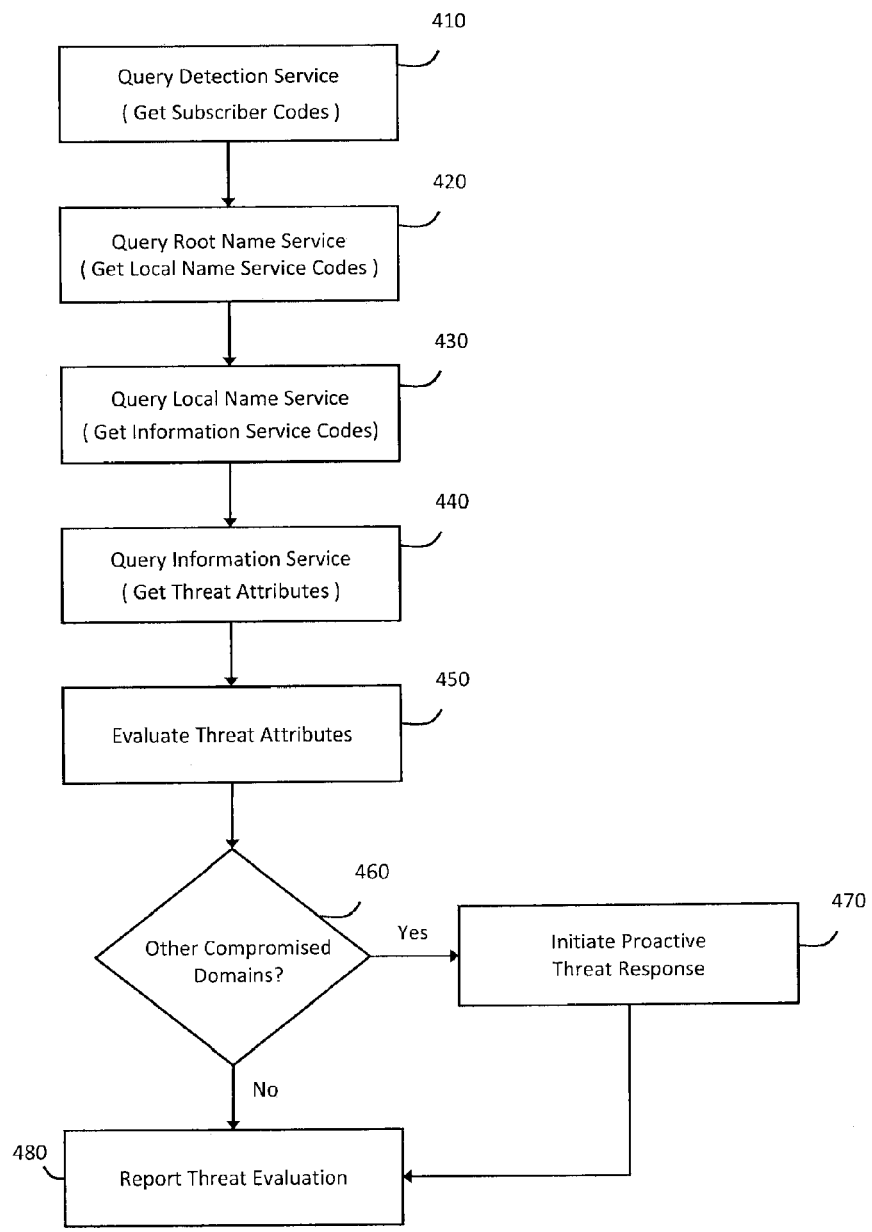
FIG. 4 illustrates an exemplary method for evaluating suspected threat instances to provide a predictive network security service model, according to one aspect of the invention.

According to one aspect of the invention, FIG. 4 illustrates an exemplary method 400 for evaluating suspected threat instances to provide a predictive network security service model. In particular, a subscriber may initially query a detection service in an operation 410 to obtain one or more subscriber codes that identify a registry, one or more network service providers, or any other subscribers that have registered knowledge about a particular threat or threat domain (e.g., as described above with reference to FIG. 3). As such, in response to obtaining the one or more subscriber codes in operation 410, the subscriber may then query a root subscriber name service with the one or more subscriber codes in an operation 420 to obtain one or more codes associated with local subscriber name services that have registered knowledge about the threat or threat domain. For example, in a context associated with the threat instance and threat domain described above in connection with FIG. 3, the registry may have registered knowledge about the threat or threat domain in response to a subscriber recording a threat instance code associated with the threat with the registry. Further, a particular network service provider may have registered knowledge about the threat or threat domain, whereby the local subscriber name service codes returned in operation 420 may identify a local subscriber name service associated with the registry and the network service provider. As such, in an operation 430, the subscriber may then query the local subscriber name services associated with the registry and the network service provider to obtain information that identifies the subscriber information service databases associated with the registry and the network service provider that store the knowledge about the threat.

In one implementation, in response to obtaining the information that identifies the subscriber information service databases associated with the registry and the network service provider that store the knowledge about the threat, the subscriber may then query the subscriber information service databases in an operation 440 to obtain any additional data attributes that the respective subscriber information service databases have about the threat. Furthermore, one or more validation engines may be used in the querying operations 410 through 440 in order to verify that the querying subscriber has appropriate access to the relevant information, and further to verify that any threat instance codes associated with the threat identified in the threat inquiry permit sharing the information detailed therein with the querying subscriber. In one implementation, assuming that the querying subscriber has authorization or an appropriate trust level that permits access to the information stored in the respective subscriber information service databases and that the threat instance codes associated with the threat instances permit sharing with the subscriber, an operation 450 may then include the subscriber obtaining and evaluating various data attributes that provide the knowledge about the threat.

In one implementation, operation 450 may include one or more predictive algorithms assessing the size, scope, potential impact, or other properties associated with the threat from the threat data attributes obtained in operation 440. For example, the predictive algorithms may generally evaluate how the threat data attributes may impact network resources or systems specifically associated with the subscriber in operation 450. Furthermore, in one implementation, an operation 460 may include utilizing the predictive algorithms to determine whether any network domains other than the network domain specifically associated with the subscriber may be compromised. For example, various domains may have different subscribers or registrars, but the root name service and/or the detection service may indicate that the different subscribers or registrars may be registered from a network domain associated with the same network service provider. As such, if the network service provider associated with the different subscribers reported information about the evaluated threat data attributes, an operation 470 may initiate proactive steps to inform the subscribers in the domain associated with the reporting network service provider that the evaluated threat may have compromised their networks. In either case, an operation 480 may then include generating a report to describe the threat evaluation, wherein the report may describe how the evaluated threat may impact network resources or systems specifically associated with the subscriber, any other network domains that the evaluated threat may have compromised, and any proactive steps that may have been initiated to notify entities associated with any such network domains that the evaluated threat may have compromised.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

The invention claimed is:

1. A distributed system for storing and accessing threat information for use in predictive modeling in a network security service, comprising:
   a detection service and a hierarchical name service that operate on one or more servers,
   the detection service configured to:
      receive, over a network from a first participant client device, a threat instance detected in the network, a threat information code that identifies a threat type associated with the threat instance and a subscriber code that uniquely identifies the first participant client device, wherein one or more data attributes associated with the threat instance are not received at the detection service;
      store a record that describes the threat instance, wherein the record includes the threat information code and the subscriber code;
      receive, over the network from a second participant client device, a request for information about a potential threat identified by the threat information code;
      obtain from storage the subscriber code that is stored with the threat information code and uniquely identifies the first participant client device; and
      return the subscriber code to the second participant client device over the network; and
   the hierarchical name service configured to:
      receive the subscriber code from the second participant client device over the network; and
      return a network location on the network associated with the first participant client device to the second participant client device over the network, wherein the network location enables the second participant client device to obtain one or more of the data attributes from the first participant client device over the network.

2. The system recited in claim 1, wherein the hierarchical name service includes a root name service node that points to a local name service node associated with the first participant client device.

3. The system recited in claim 2, wherein the local name service node associated with the first participant client device stores information that identifies an information service database containing the one or more data attributes associated with the threat instance.

4. The system recited in claim 3, wherein the location associated with the first participant client device identifies the local name service node associated with the first participant client device to enable the second participant to obtain the one or more data attributes associated with the threat instance from the information service database.

5. The system recited in claim 3, wherein an information service arranges the information service database within a hierarchy having multiple databases to store records that describe threat instances detected in the network.

6. The system recited in claim 1, wherein the record stored in the detection service to describe the threat instance further includes a unique identifier that serializes the threat instance, a timestamp that indicates when the detection service stored the record associated with the threat instance, and a visibility flag that controls sharing the record.

7. The system recited in claim 6, wherein the one or more servers are configured to return the subscriber code to the second participant client device in response to the visibility flag indicating that the record can be shared with the second participant client device.

8. A method for storing and accessing threat information for use in predictive modeling in a network security service, comprising:
   receiving, at a detection service server over a network from a first participant client device, information that describes a threat instance detected in the network, the information comprising a threat information code that identifies a threat type associated with the threat instance and a subscriber code that uniquely identifies the first participant client device, wherein one or more data attributes associated with the threat instance are not received at the detection service server;
   storing a record that describes the threat instance in a database coupled to the detection service server, wherein the record includes the threat information code and the subscriber code;
   receiving, over the network from a second participant client device, a request for information about a potential threat identified by the threat information code;
   obtaining from storage the subscriber code that is stored with the threat information code and uniquely identifies the first participant client device;
   returning the subscriber code to the second participant client device over the network;
   receiving, at a hierarchical name service, the subscriber code from the second participant client device over the network; and
   returning a network location on the network associated with the first participant client device to the second participant client device over the network, wherein the network location identifies a local name service node associated with the first participant client device in the hierarchical name service to enable the second participant client device to obtain one or more of the data attributes from the first participant client device over the network.

9. The method recited in claim 8, wherein the hierarchical name service includes a root name service node that points to the local name service node associated with the first participant client device in the hierarchical name service.

10. The method recited in claim 8, wherein the local name service node associated with the first participant client device stores information that identifies an information service database containing the one or more data attributes associated with the threat instance.

11. The method recited in claim 10, wherein the location associated with the first participant client device identifies the local name service node associated with the first participant to enable the second participant to obtain the one or more data attributes associated with the threat instance from the information service database.

12. The method recited in claim 10, wherein an information service arranges the information service database within a hierarchy having multiple databases to store records that describe threat instances detected in the network.

13. The method recited in claim 8, wherein the record stored in the database to describe the threat instance further includes a unique identifier that serializes the threat instance, a timestamp that indicates when the database stored the record associated with the threat instance, and a visibility flag that controls sharing the record.

14. The method recited in claim 13, wherein the detection service server returns the subscriber code to the second participant client device in response to the visibility flag indicating that the record can be shared with the second participant client device.

15. A registry server in a distributed system for storing and accessing threat information for use in predictive modeling in a network security service, the registry server comprising:
- an information service database configured to store a record that describes a threat instance detected in a network, wherein the record includes a threat information code that identifies a threat type associated with the threat instance and one or more data attributes associated with the threat instance;
- one or more processors configured to register information about the threat instance over the network with a detection service server associated with the network security service, wherein the registered information includes the threat information code that identifies the threat type associated with the threat instance and a subscriber code that uniquely identifies the registry server, but not the one or more data attributes associated with the threat instance; and
- a local name service configured to:
  - receive over the network a request from participant client device;
  - obtain from storage a database location associated with the information service database based on the threat information code, and
  - return the database location to the participant client device;
  - wherein the database location enables the participant client device to obtain the one or more data attributes from the information service database over the network.

16. The system recited in claim 15, wherein the information service database is further configured to return the one or more data attributes associated with the threat instance to the participant client device in response to the participant client device using the threat instance code to query the location associated with the information service database.

17. The system recited in claim 15, further comprising a validation engine configured to:
- receive, from the participant client device, a request to obtain the one or more data attributes associated with the threat instance at the location associated with the information service database, wherein the request includes the threat information code that identifies the threat type associated with the threat instance;
- deny the request to obtain the one or more data attributes associated with the threat instance in response to determining that the participant client device lacks authorization to access the information service database; and
- grant the request to obtain the one or more data attributes associated with the threat instance in response to determining that the participant client device has authorization to access the information service database, wherein the information service database is further configured to return the one or more data attributes associated with the threat instance to the participant client device in response to the validation engine granting the request.

18. The system recited in claim 15, wherein the information service database stores the record that describes the threat instance in response to a registrar associated with the network security service recording the detected threat instance with the information service database.

19. The system recited in claim 15, wherein the local name service is further configured to:
- cache the location associated with the information service database and the threat information code that identifies the threat type associated with the threat instance in response to the participant client device using the threat instance code to query the local name service; and
- return the cached location to another participant client device in the network security service in response to the other participant client device subsequently using the cached threat instance code to query the local name service.

20. The system recited in claim 15, further comprising a hierarchical name service that includes a root name service node that points to a local node associated with the local name service.

21. The system recited in claim 15, further comprising an information service that arranges the information service database within a hierarchy having multiple databases to store records that describe threat instances detected in the network.

22. A method for storing and accessing threat information at a registry server for use in predictive modeling in a network security service, the method comprising:
- storing a record that describes a threat instance detected in a network in an information service database, wherein the record includes a threat information code that identifies a threat type associated with the threat instance and one or more data attributes associated with the threat instance;
- communicating information about the threat instance over the network to a detection service server associated with the network security service to register the information therewith, wherein the information includes the threat information code that identifies the threat type associated with the threat instance and a subscriber code that uniquely identifies the registry server, but not the one or more data attributes associated with the threat instance;
- receiving a request from a participant client device;
- obtaining from storage a database location associated with the information service database based on the threat information code, and
- returning the database location to the participant client device over the network;
- wherein the database location enables the participant client device to obtain the one or more data attributes from the information service database over the network.

23. The method recited in claim 22, further comprising returning the one or more data attributes associated with the threat instance from the information service database to the participant client device in response to the participant client device using the threat instance code to query the location associated with the information service database.

24. The method recited in claim 22, further comprising:
- receiving, from the participant client device, a request to obtain the one or more data attributes associated with the threat instance at the location associated with the information service database, wherein the request includes the threat information code that identifies the threat type associated with the threat instance;
- denying the request to obtain the one or more data attributes associated with the threat instance in response to a validation engine determining that the participant client device lacks authorization to access the information service database;
- granting the request to obtain the one or more data attributes associated with the threat instance in response to the validation engine determining that the participant client device has authorization to access the information service database; and returning the one or more data attributes associated with the threat instance from the information service database to the participant client device in response to granting the request.

25. The method recited in claim 22, wherein the information service database stores the record that describes the threat instance in response to a registrar associated with the network security service recording the detected threat instance with the information service database.

26. The method recited in claim 22, further comprising:
caching, in the local name service, the location associated with the information service database and the threat information code that identifies the threat type associated with the threat instance in response to the participant client device using the threat instance code to query the local name service; and
returning the cached location from the local name service to another participant client device in the network security service in response to the other participant client device subsequently using the cached threat instance code to query the local name service.

27. The method recited in claim 22, wherein a hierarchical name service includes a root name service node that points to a local node associated with the local name service.

28. The method recited in claim 22, wherein an information service arranges the information service database within a hierarchy having multiple databases to store records that describe threat instances detected in the network.

29. A registrar computer system in a distributed system for accessing threat information for use in predictive modeling in a network security service, the registrar computer system configured to:
communicate a first query to a detection service server over the network, the first query includes a threat instance code that identifies a threat type;
in response to the first query, receive over the network from the remote detection service server one or more subscriber codes that uniquely identify one or more participant client devices in the network security service, wherein the one or more participant client devices had previously registered one or more threat instances having the threat type identified in the threat instance code;
communicate a second query over the network to a hierarchical name service server, the second query includes the one or more subscriber codes,
in response to the second query, receive over the network from the hierarchical name service server one or more network locations on the network associated with the one or more participant client devices; and
retrieve over the network one or more data attributes associated with the one or more threat instances from the one or more participant client devices using the one or more network locations.

30. The system recited in claim 29, wherein the one or more locations associated with the one or more participant client devices identify one or more local name service nodes associated with the one or more participants.

31. The system recited in claim 30, wherein to obtain the one or more data attributes associated with the one or more threat instances, the registrar computer system is further configured to:
communicate one or more requests to the one or more locations that identify the one or more local name service nodes associated with the one or more participant client devices, wherein the one or more requests include the threat instance code; and
receive information that identifies one or more information service databases that store the one or more threat instances having the threat type from the one or more local name service nodes associated with the one or more participant client devices, wherein the registrar computer system is configured to obtain the one or more data attributes associated with the one or more threat instances from the one or more information service databases.

32. The system recited in claim 29, wherein the registrar computer system is further configured to execute an application to evaluate the one or more data attributes associated with the one or more threat instances.

33. The system recited in claim 32, wherein the registrar computer system is further configured to use one or more predictive algorithms associated with the application and the one or more evaluated data attributes to assess a size and a scope that the threat type has on the registrar computer system.

34. The system recited in claim 32, wherein the registrar computer system is further configured to use one or more predictive algorithms associated with the application and the one or more evaluated data attributes to assess a path that the one or more threat instances traveled in the network.

35. The system recited in claim 34, wherein the registrar computer system is further configured to use the one or more predictive algorithms and the one or more evaluated data attributes to assess how the one or more threat instances morphed in the path that the one or more threat instances traveled in the network.

36. The system recited in claim 34, wherein the registrar computer system is further configured to:
use the one or more predictive algorithms and the one or more evaluated data attributes to assess one or more domains in the network that the one or more threat instances compromised in the path that the one or more threat instances traveled in the network; and
notify one or more entities associated with the one or more domains to indicate that the one or more threat instances compromised the one or more domains.

37. A method using a computer system for accessing threat information for use in predictive modeling in a network security service, the method comprising:
communicating a first query to a detection service server over the network, the first query includes a threat instance code that identifies a threat type;
in response to the first query, receiving, over the network from the remote detection service sever, one or more subscriber codes that uniquely identify one or more participant client devices in the network security service, wherein the one or more participant client devices had previously registered one or more threat instances having the threat type identified in the threat instance code;
communicating a second query over the network to a hierarchical name service server, the second query includes the one or more subscriber codes,
in response to the second query, receiving over the network from the hierarchical name service one or more network locations associated with the one or more participant client devices; and
retrieving over the network one or more data attributes associated with the one or more threat instances from the one or more participant client devices using the one or more network locations.

38. The method recited in claim 37, wherein the one or more locations associated with the one or more participants identify one or more local name service nodes associated with the one or more participant client devices.

39. The method recited in claim 38, wherein obtaining the one or more data attributes associated with the one or more threat instances includes:
 communicating one or more requests to the one or more locations that identify the one or more local name service nodes associated with the one or more participant client devices, wherein the one or more requests include the threat instance code; and
 receiving information that identifies one or more information service databases that store the one or more threat instances having the threat type from the one or more local name service nodes associated with the one or more participant client devices, wherein the computer system obtains the one or more data attributes associated with the one or more threat instances from the one or more information service databases.

40. The method recited in claim 37, further comprising executing an application on the computer system to evaluate the one or more data attributes associated with the one or more threat instances.

41. The method recited in claim 40, further comprising using one or more predictive algorithms associated with the application and the one or more evaluated data attributes to assess a size and a scope that the threat type has on the computer system.

42. The method recited in claim 40, further comprising using one or more predictive algorithms associated with the application and the one or more evaluated data attributes to assess a path that the one or more threat instances traveled in the network.

43. The method recited in claim 42, further comprising using the one or more predictive algorithms and the one or more evaluated data attributes to assess how the one or more threat instances morphed in the path that the one or more threat instances traveled in the network.

44. The method recited in claim 42, further comprising:
 using the one or more predictive algorithms associated with the application and the one or more evaluated data attributes to assess one or more domains in the network that the one or more threat instances compromised in the path that the one or more threat instances traveled in the network; and
 notify one or more entities associated with the one or more domains to indicate that the one or more threat instances compromised the one or more domains.

* * * * *